(12) United States Patent
Sen et al.

(10) Patent No.: US 8,873,429 B2
(45) Date of Patent: Oct. 28, 2014

(54) METHOD AND SYSTEM TO DYNAMICALLY DETECT AND FORM A MASTER SLAVE NETWORK

(71) Applicants: Sougata Sen, Bangalore (IN); Ketan Patil, Kolkata (IN); Animikh Ghosh, Bangalore (IN); Parag Chauhan, Ghaziabad (IN); Kumar Padmanabh, Bangalore (IN)

(72) Inventors: Sougata Sen, Bangalore (IN); Ketan Patil, Kolkata (IN); Animikh Ghosh, Bangalore (IN); Parag Chauhan, Ghaziabad (IN); Kumar Padmanabh, Bangalore (IN)

(73) Assignee: Infosys Limited, Bangalore (IN)

( * ) Notice: Subject to any disclaimer, the term of this patent is extended or adjusted under 35 U.S.C. 154(b) by 193 days.

(21) Appl. No.: 13/716,040

(22) Filed: Dec. 14, 2012

(65) Prior Publication Data

US 2013/0163410 A1  Jun. 27, 2013

(30) Foreign Application Priority Data

Dec. 22, 2011  (IN) .......................... 4523/CHE/2011

(51) Int. Cl.
*H04L 12/28* (2006.01)
*H04W 84/20* (2009.01)
*H04W 24/04* (2009.01)

(52) U.S. Cl.
CPC .............. *H04W 84/20* (2013.01); *H04W 24/04* (2013.01)
USPC ............ 370/254; 370/252; 370/352; 370/389

(58) Field of Classification Search
CPC ....................................... H04W 84/20
USPC .................. 370/252, 254, 352, 389
See application file for complete search history.

(56) References Cited

U.S. PATENT DOCUMENTS

| 7,860,099 B2 * | 12/2010 | Chuang et al. ................. 370/392 |
| 2005/0123109 A1 * | 6/2005 | Yamagishi et al. ...... 379/102.01 |
| 2006/0235972 A1 * | 10/2006 | Asnis .............................. 709/225 |
| 2008/0170566 A1 * | 7/2008 | Akimoto ....................... 370/389 |
| 2012/0042030 A1 * | 2/2012 | Deshmukh et al. ........... 709/208 |

* cited by examiner

*Primary Examiner* — Brian D Nguyen
*Assistant Examiner* — Toan Nguyen
(74) *Attorney, Agent, or Firm* — Stephen M. Hertzler; Marc S. Kaufman; Reed Smith LLP

(57) ABSTRACT

This invention describes a system and method for dynamically establish and maintain a MASTER SLAVE Network among the devices with wireless and wired connectivity. It also provides system and method for maintaining a MASTER SLAVE network in the event where the SLAVE or the MASTER or the server is dead. More importantly, it supports automatic network discovery, establishment and maintenance to provide end to end connectivity by using minimum resources of an enterprise network.

11 Claims, 5 Drawing Sheets

METHOD AND SYSTEM TO DYNAMICALLY DETECT AND FORM A MASTER SLAVE NETWORK

RELATED APPLICATION DATA

This application claims priority to Indian Patent Application No. 4523/CHE/2011, filed Dec. 22, 2011, which is hereby incorporated by reference in its entirety.

FIELD OF INVENTION

The present invention relates generally to the detection and formation of a MASTER SLAVE network and, in particular, to a system and method to dynamically establish and maintain a MASTER SLAVE network among devices with wireless and wired connectivity.

BACKGROUND OF THE INVENTION

Presently, in any embedded systems which have wireless as well as wired or Ethernet connectivity, when deployed in general enterprise level local area network, it is difficult to detect which devices are plugged into a local area network and, thusly, difficult to estimate whether a device is connected to an Ethernet, or a wireless system. Consequently, there may be no specific mechanism by which a particular device can be termed as a MASTER device or a SLAVE device, thereby complicating an effort to establish a MASTER SLAVE architecture possessing end to end connectivity.

One problem with the establishment of such a network is that it cannot be established randomly as network dynamics may change continuously.

Another problem with such network is limited transmission range of the wireless unit; in such a scenario, there is need of more than one MASTER device to control one or more SLAVE devices for end to end connectivity.

In view of the foregoing discussion, there is a need for an automatic network discovery, establishment and maintenance mechanism to establish end to end connectivity using minimal resources of an enterprise network.

SUMMARY OF THE INVENTION

The shortcomings of the prior art are overcome and additional advantages are provided through the provision of a method and system as described in the description.

The present disclosure solves the limitations of existing techniques by providing a method and system to dynamically detect and form a master slave network among devices with wireless and wired connectivity.

In one embodiment, the disclosure provides a system to dynamically detect and form a master slave network. The system includes a server for broadcasting at least one packet in a unified data packet (UDP) format, a first group of sensor devices and a second group of sensor devices. The first group of sensor devices comprises at least one sensor device possessing a booting module, a response module, a wired connectivity and a wireless connectivity. The second group of sensor devices comprises at least one sensor device possessing a booting module and a wireless connectivity. The system receives at least one UDP packet broadcast by the first group of sensor devices, and boots up at least one sensor device of the first group of sensor devices as a SLAVE device. The SLAVE device is a sensor device which is controlled by a MASTER sensor device. On receiving the UDP packet by first group of sensor devices, the first group of sensor devices sends a response to the server which comprises a MAC address associated with a sensor device. Thereafter, the server responds to the at least one device in the first group of sensor devices with a server IP address and a first identification code. The device which receives the server IP address and the first identification code declare itself as a MASTER device. The MASTER device is a sensor device which controls at least one SLAVE sensor device. The device which declares itself as the MASTER device, authenticates at least one device in the second group of sensor devices as a SLAVE device by receiving and decoding a data packet from the at least one SLAVE sensor device and subsequently updates a maintained MASTER routing table with a unique identifier and a MAC address of at least one device in the second group of sensor devices, and establishes a MASTER SLAVE network thereof.

In one embodiment, the disclosure provides a method to dynamically detect and form a master slave network. The method includes a server for broadcasting at least one packet in a unified data packet (UDP) format, a first group of sensor devices and a second group of sensor devices. The first group of sensor devices comprises at least one sensor device possessing a booting module, a response module, a wired connectivity and a wireless connectivity. The second group of sensor devices comprises at least one sensor device possessing a booting module and a wireless connectivity. The method further includes receiving at least one UDP packet broadcast by the server by the first group of sensor devices, and booting up at least one sensor device in the first group of sensor devices as a SLAVE device. The SLAVE device is a sensor device which is controlled by a MASTER sensor device. On receiving the UDP packet by the first group of sensor devices, at least one device of the first group of sensor devices sends a response to the server which comprises a MAC address associated with that particular sensor device. Thereafter, the server responds to at least one device in the first group of sensor devices with a server IP address and a first identification code. The device which receives the server IP address and the first identification code declare itself as a MASTER device wherein the MASTER device is a sensor device which controls at least one SLAVE sensor device. The device which declares itself as the MASTER device, authenticates at least one device in the second group of sensor devices as a SLAVE device by receiving and decoding a data packet from the at least one SLAVE sensor device and subsequently updating a maintained MASTER routing table with a unique identifier and a MAC address of at least one device in the second group of sensor devices, and establishes a MASTER SLAVE network thereof.

The foregoing summary is illustrative and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
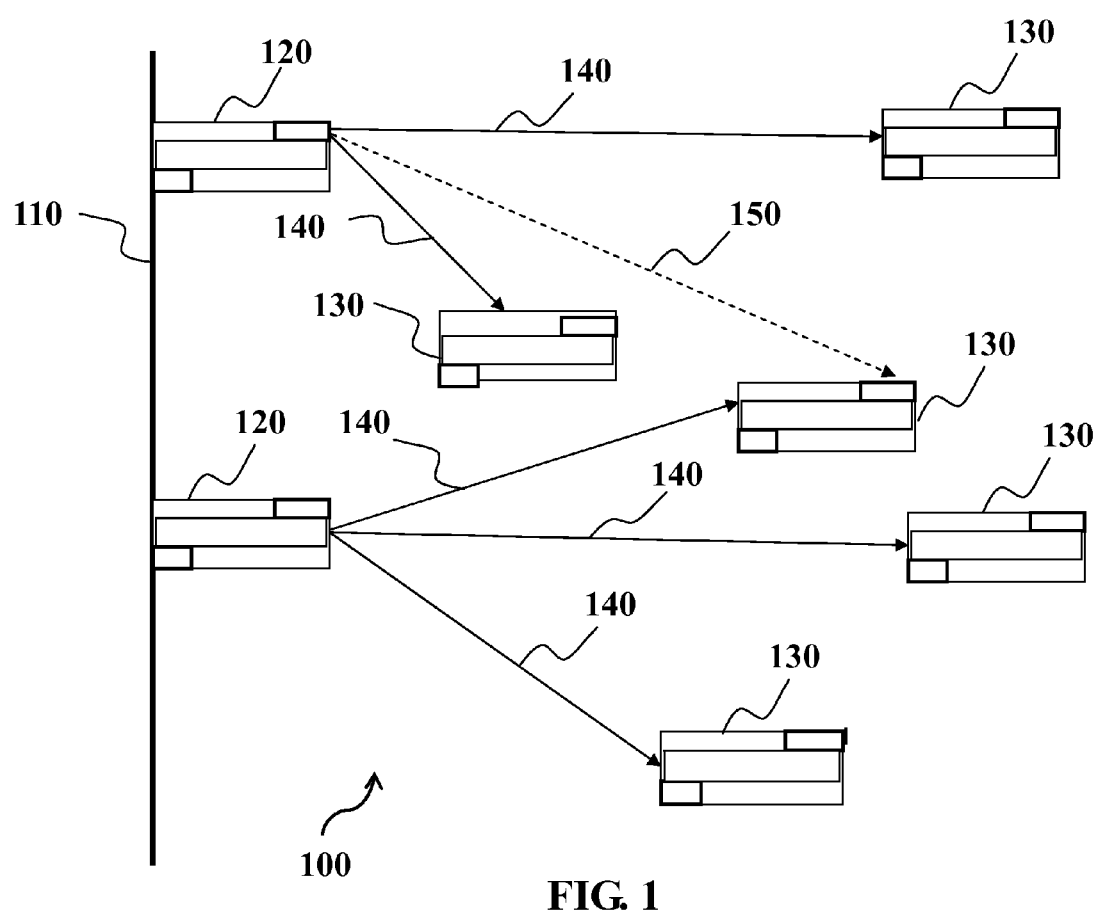
FIG. 1 is an exemplary illustration of the deployment of a number of sensor devices in an enterprise level local area connection.

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

According to the embodiments of the present disclosure, the present invention provides a system and method for the dynamically establishment and maintenance of a MASTER SLAVE network in an enterprise among the devices with the wireless and wired connectivity. The disclosure also provides the system and method for the maintenance of the MASTER SLAVE network automatically. Additionally, the present system and method provides a dead SLAVE, a dead MASTER and a dead server handling in the MASTER SLAVE Network in an enterprise among devices with wireless and wired connectivity. The MASTER devices referred herein are the MASTER sensor devices belongs to the first group of sensor devices and the SLAVE devices referred herein are the SLAVE sensor devices belongs to the second group of sensor devices hence shall not be interpreted otherwise.

According to one of the embodiment of the present invention a system and method to dynamically establish and maintain a MASTER SLAVE Network among the devices with the wireless and the wired connectivity includes a first group of sensor devices possessing a booting module, a response module, a wired connectivity and a wireless connectivity. It also includes a second group of sensor devices possessing a booting module and a wireless module. The booting module is configured to boots up the sensor devices of the first and second group as a SLAVE device. The SLAVE device is a device which is controlled by at least a MASTER device. The response module of the first group of sensor devices is configured to send a response of receiving UDP, to the server. The wired connectivity could be Ethernet port or LAN connectivity which waits to receive the data packet till one of the network sensor devices is plugged into a RJ-45 socket of a enterprise local area network whereas the wireless connectivity waits to receive data packet on its channel till one of the network sensor devices is plugged into the RJ-45 socket of the enterprise local area network.

According to one of the embodiment of the present invention, a server broadcast the unified data packet (UDP) and keep broadcasting to a specific port number till one of the network sensor devices is plugged into the RJ-45 socket of the enterprise local area network. The response of receiving the data packet to the server comprises a medium access control (MAC) layer address associated with a sensor device in the first group of sensor devices which provides a data link layer of the Ethernet LAN system. The server stores the response of receiving the data packet from the first group of sensor devices, in a server routing table.

The server responds to at least one device of the first group of sensor devices with a server IP address and a first identification code. The first identification code is a unique user understandable identifier that remains unique throughout the network operation. The device which receives the server IP address and unique first identification code declare itself formally as a MASTER device wherein the MASTER device is a which controls at least one SLAVE device.

The devices of second group of sensor devices sends the data packet to at least one MASTER device wherein the data packet comprises an association parameter which includes a medium access control (MAC) id, a node id a personal area network (PAN) id, a link index, an Received Signal Strength Index (RSSI) id and an association code. The MASTER device receives the data packet and decodes the association parameter in order to assign a unique in identifier to at least one slave device, subsequently the MASTER updates a maintained routing table with the unique identifier and MAC address of at least one SLAVE device and establishes a MASTER SLAVE network thereof.

FIG. 1 is an exemplary illustration of the deployment of a number of sensor devices in an enterprise level local area connection. According to the illustration in FIG. 1, a wired or an Ethernet or a Local area network (LAN) connection 110, connecting at least one device of first group of sensor devices 120 wherein the first group of sensor devices comprises a booting module, a response module, a wired connectivity and a wireless connectivity. The second group of sensor devices 130 comprises a booting module and a wireless connectivity 140. The devices of first group 120 and second group 130 boots up as SLAVE sensor devices. The server broadcast the data packet in unified data packet (UDP) format, and the first group of sensor devices receives the data packet and responds to the server wherein the response comprises a medium access control (MAC) layer address. The sever responds to at least one device of the first group of devices with a server IP address and a first identification code; the device which receives the response from the server declare itself as a MASTER device. The MASTER device receives and decodes the data packet from the second group of sensor devices and authenticates at least one device in the second group of sensor devices as a SLAVE device. In the event that one or more MASTER receives the data packet from a SLAVE device, the SLAVE chooses to respond to the MASTER device having maximum signal strength. In FIG. 1 the SLAVE does not respond to a MASTER device having minimum or less signal strength 150. The signal strength is a radio signal strength of the wireless connectivity of the MASTER sensor device. One or more devices in network can be the MASTER and they can independently handle multiple numbers of the slaves. A Slave associates with the MASTER which is having better signal strength (high RSSI and link quality value).

The SLAVE devices calculate the wireless signal strength of the MASTERS. The MASTER with stronger signal strength is selected and weaker is rejected. In the FIG. 1 the device having the wired connectivity declare itself as a MASTER and start sending the unique packets on its wireless channel in order to establish a MASTER SLAVE network of its own.

Figure 2:
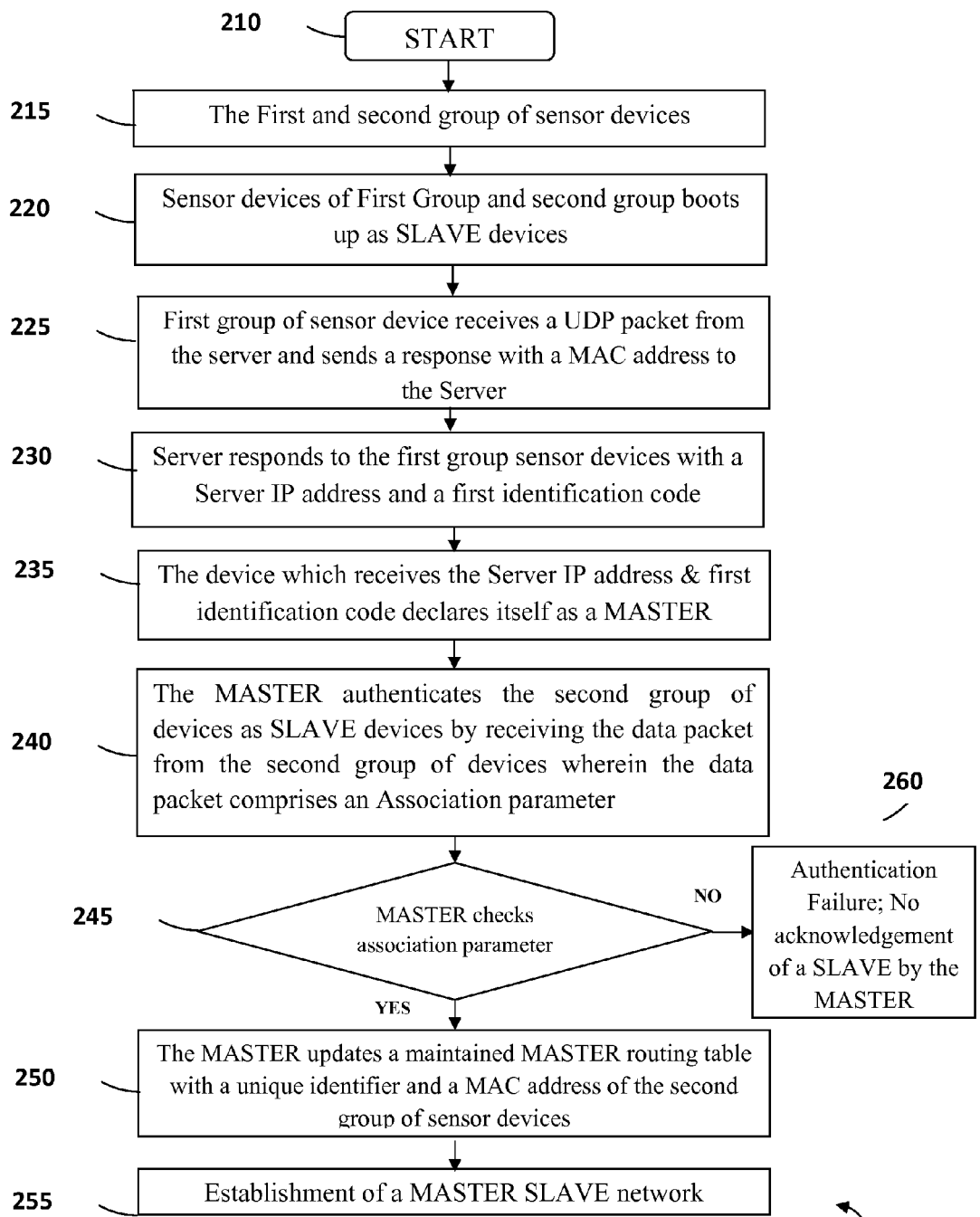
FIG. 2 shows an exemplary process flow of steps performed for the dynamically establishing and maintaining a MASTER SLAVE network in an enterprise among devices with wireless and wired connectivity.

FIG. 2 shows an exemplary process flow of steps performed for dynamically establishing and maintaining a MASTER SLAVE network in among the devices with wireless and wired connectivity. The said system and method includes a first group and second group of sensor devices. The first and second group of sensor devices 215, boots up as SLAVE devices 220, wherein the first group of sensor devices with the wired connectivity receives the UDP packet from the server and sends a response to the server with a MAC id 225. The server responds to the first group of sensor devices with a server IP address and a first identification code 230. The device which receives the response from the server declares itself as a MASTER device 235. The device which declare itself as the MASTER device receives the data packet from the second group of devices and authenticates the devices as a SLAVE devices 240 by checking the association parameter of the data packet 245. If the authentication of SLAVE fails the MASTER device does not acknowledge the device as its SLAVE device 260. If authentication is successful the MASTER updates its maintained MASTER routing table with a unique identifier and a MAC address of second group of sensor devices 250. The association of the MASTER devices and the SLAVE devices establishes a MASTER SLAVE network.

Figure 3:
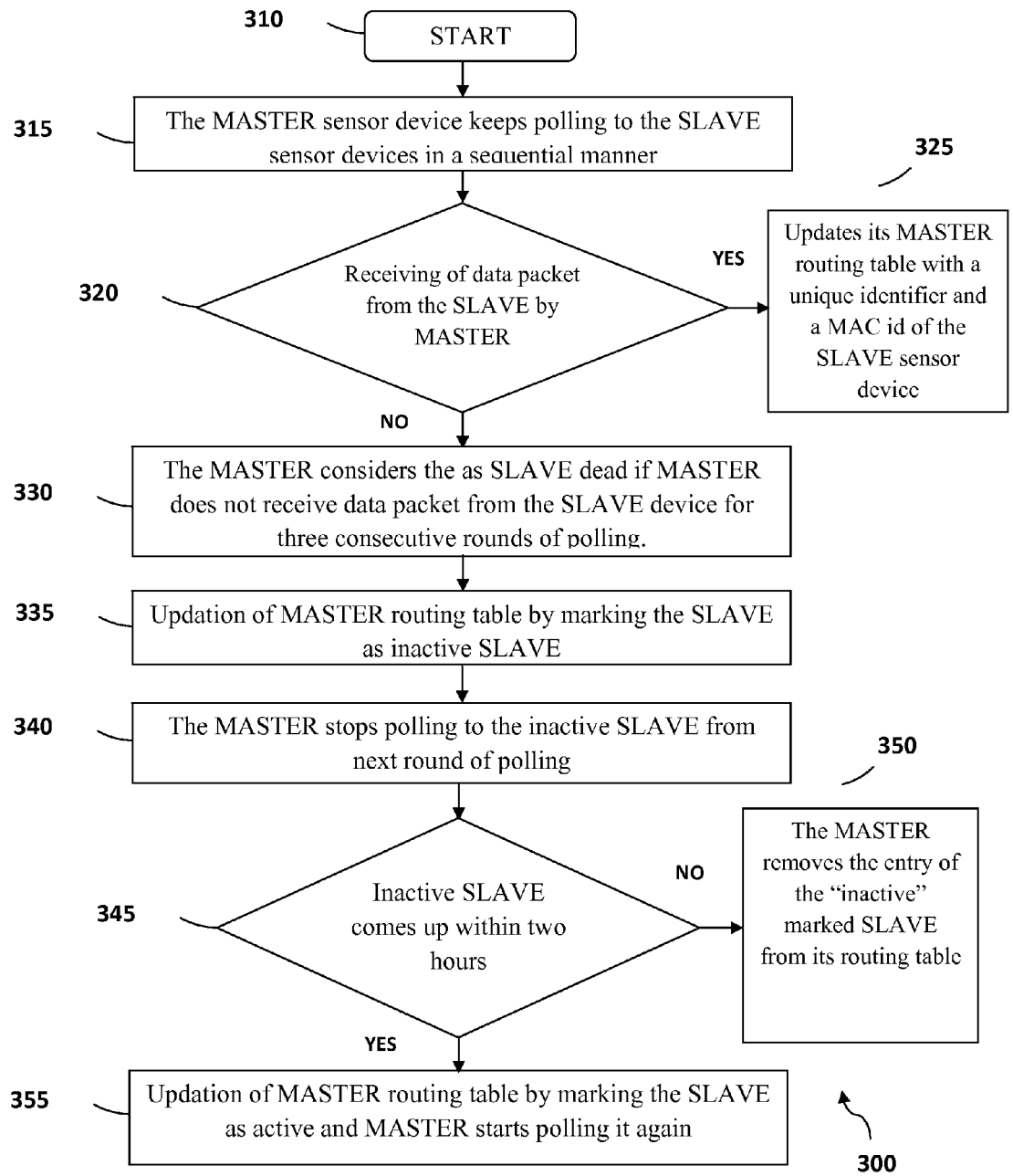
FIG. 3 shows an exemplary process flow of steps performed for maintenance and handling of a MASTER SLAVE network in the event that the SLAVE is considered dead by the MASTER device.

FIG. 3 shows an exemplary process flow of steps performed for maintenance and handling of a MASTER SLAVE network in the event that a SLAVE is considered dead by a MASTER. In an active state when all the MASTER and SLAVES are connected to a network, the MASTER keeps polling the SLAVE sensor devices in a sequential manner 315 and maintains a normal polling cycle. The polling cycle is a sequence of one or more time bound requests for the data packet initiated by a MASTER to one or more SLAVE devices, the MASTER receives the data packet from the SLAVE devices 320 and updates its maintained routing table with a time stamp and a SLAVE MAC id 325. In the event that the data packet is not received by the MASTER from a SLAVE for consecutive three rounds of polling, the MASTER considers the SLAVE as dead 330 and updates its maintained routing table by marking that particular SLAVE as an inactive SLAVE 335 and intimates same to the server. The MASTER stops polling to the inactive slave from the next round of polling 340. In the event that the inactive SLAVE does not comes up within two hours after the marking of that SLAVE as the inactive SLAVE 345, the MASTER removes the entry of the inactive SLAVE from its routing table 350. In the event that the inactive SLAVE comes up within two hours after the marking of that SLAVE as the inactive SLAVE 345, the MASTER marks that inactive SLAVE as active a SLAVE and starts polling again to that particular SLAVE device 355.

Figure 4:
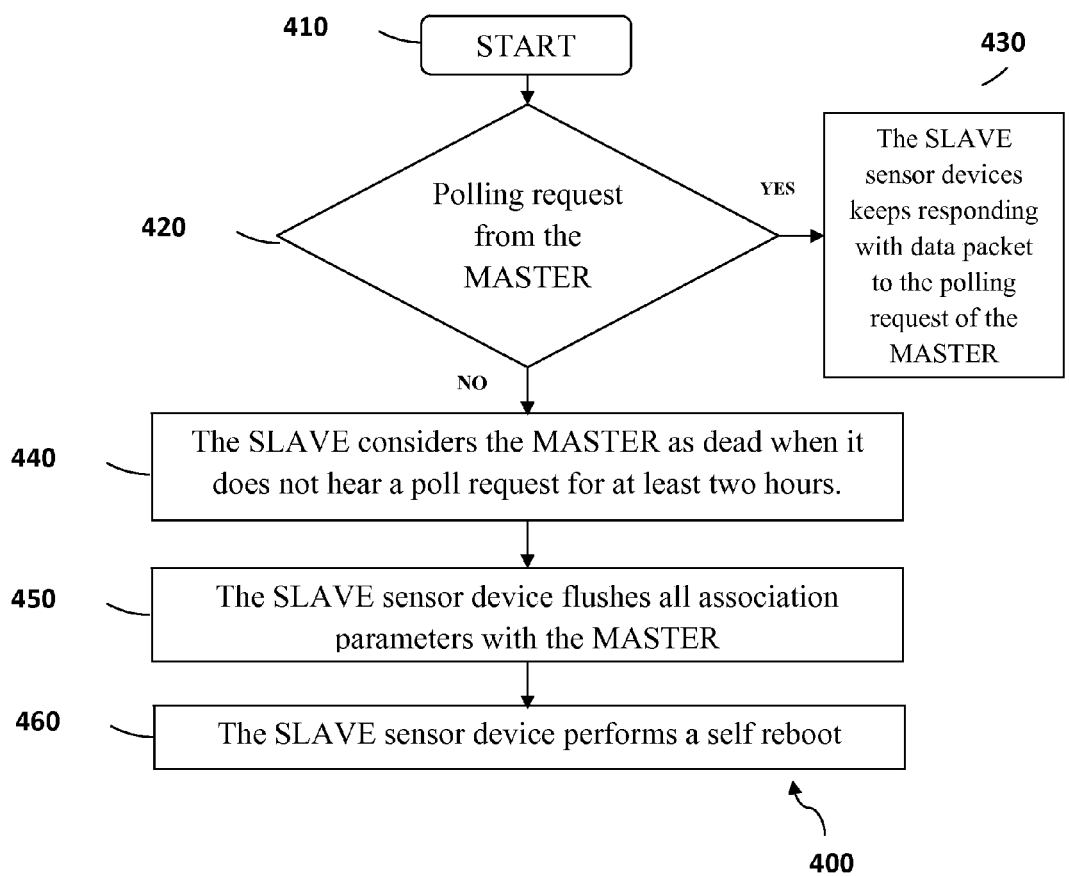
FIG. 4 shows an exemplary process flow of steps performed for maintenance and handling of a MASTER SLAVE network in the event that the MASTER is considered dead by the SLAVE device.

FIG. 4 shows an exemplary process flow of steps performed for maintenance and handling of a MASTER SLAVE network in the event that a MASTER is considered as dead by a SLAVE device. In an active state the MASTER and SLAVE maintains a network connection between them. In the active state the SLAVE devices respond with a data packet to only that MASTER's polling request 420, 430, with which they are associated, and do not respond to any other route request from any other MASTER. Each SLAVE maintains a timestamp as to when it was last polled. In the event that there is no polling request from the MASTER with which the SLAVE device is associated, for at least two hours, the SLAVE considers the MASTER as dead 440. In the event that the SLAVE considers the MASTER as dead, the SLAVE flushes all the association parameter with its MASTER 450 and performs a self boot 460. When the SLAVE considers the MASTER as dead, it prepares itself to respond to the polling request of other MASTER's route request and repeat the steps of FIG. 1 in order to find a new MASTER.

Figure 5:
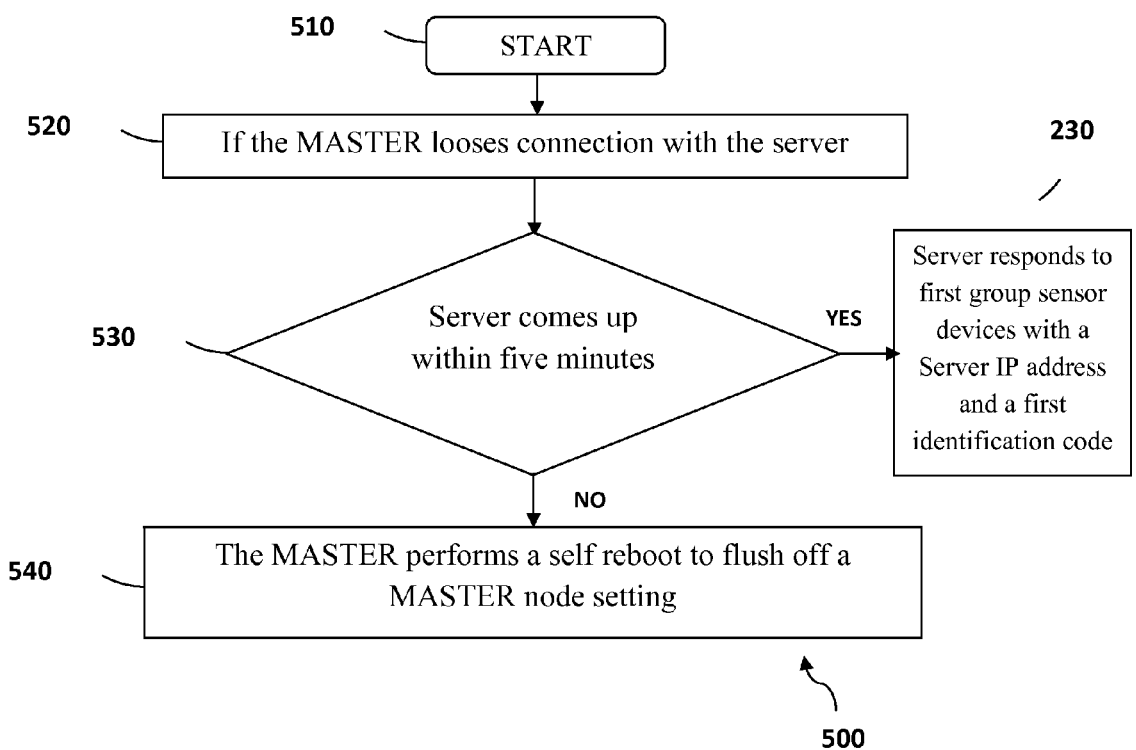
FIG. 5 shows an exemplary process flow of steps performed for maintenance and handling of a MASTER SLAVE network in the event that the server is considered dead by the MASTER device.

FIG. 5 is a flow chart for maintenance and handling of a MASTER SLAVE network in the event that a server is considered dead by a MASTER. In the event that the MASTER looses the connection with the server 520, it waits for at least five minutes for server to come up 530. If server come up within five minutes the server continues its normal operation of sending response to the first group of sensor devices with the server IP address and identification code 230, however in the event when the server does not come up within five minutes, the MASTER performs a self reboot to flush off all the MASTER node setting 540 wherein the MASTER node setting comprises a routing table of SLAVES, an identifier from the server, an IP address of the server and an association parameter. When the MASTER flushes off the MASTER node setting, it reboots again as a SLAVE device. Since it has LAN cable connected, it keeps looking for a server UDP packet. Alternatively, it looks for a MASTER in vicinity to associate with it as the SLAVE. If said device receives the server UDP packet it repeats the steps 230, 235, 240, 245, 260, 250 and 255, and starts performing functions of the MASTER. If the said device receives the data packet request from any other MASTER device, it responds to the said MASTER request and starts behaving as a SLAVE device. After the rebooting of the sensor devices, it behavior as MASTER or SLAVE depends upon the receiving, the type of data packet.

While the various embodiments of the invention have been illustrated and described, it will be clear that the invention is not limited only to these embodiments. Numerous modifications, changes, variations, substitutions, and equivalents will be apparent to those skilled in the art, without departing from the spirit and scope of the invention.

We claim:

1. A system to dynamically detect and form a master slave network, the master slave network comprising:
   a server for broadcasting at least one packet in a unified data packet (UDP) format;
   a first group of sensor devices, the first group of sensor devices comprising at least one sensor device possessing a booting module, a response module, a wired connectivity and a wireless connectivity;
   a second group of sensor devices, the second group of sensor devices comprising at least one sensor device possessing a booting module and a wireless connectivity;
   receiving at least one UDP packet broadcast by the server by the first group of sensor devices, and booting up at least one sensor device in the first group of sensor devices as a SLAVE device, wherein a SLAVE device is a sensor device which is controlled by a MASTER sensor device;
   sending a response to the server from the first group of sensor devices, wherein the response comprises a MAC address associated with a sensor device in the first group of sensor devices;

responding, by the server, to at least one device in the first group of sensor devices with a server IP address and a first identification code;

receiving, by at least one device in the first group of sensor devices, the server IP address and the first identification code, with said device declaring itself as a MASTER thereupon, wherein a MASTER device is a sensor device which controls at least one SLAVE sensor device;

authenticating, by the MASTER device, at least one device in the second group of sensor devices as a SLAVE device by receiving and decoding a data packet from the at least one SLAVE sensor device; and updating, by the MASTER device, a maintained MASTER routing table with a unique identifier and a MAC address of at least one device in the second group of sensor devices, and establishing a MASTER SLAVE network thereby.

2. The system of claim 1, wherein the data packet received by the MASTER device comprises an association parameter, wherein the association parameter further comprises a medium access control (MAC) layer id, a node id, a Personal Area Network (PAN) id, a link index, an RSSI (Received Signal Strength Index) id and an association code.

3. The system of claim 1, wherein if the data packet sent by the SLAVE sensor device, is received by the MASTER sensor device, the SLAVE device responds to the MASTER device having a maximum signal strength wherein the maximum signal strength is a radio signal strength of the wireless connectivity of the MASTER device.

4. The system of claim 1, wherein the server stores the response from the first group of sensor devices in a server routing table.

5. The system of claim 4, wherein in the event of the MASTER device considers the SLAVE device as dead, the MASTER device updates the MASTER routing table by marking a dead SLAVE device as an inactive SLAVE device and stops polling to the inactive SLAVE device from a next sequence of the polling cycle.

6. The system of claim 1, wherein:

if a data packet is not received from a SLAVE device for three consecutive rounds of a polling cycle, wherein the polling cycle is a sequence of one or more time bound requests for the data packet initiated by a MASTER device to one or more SLAVE devices, then the MASTER device considers the SLAVE device dead.

7. The system of claim 6, wherein in the event the MASTER device receives the data packet from the inactive SLAVE device, the MASTER device updates the master routing table by marking the inactive SLAVE device as an active SLAVE device and starts polling to the active SLAVE device.

8. The system of claim 7, wherein in the event that the SLAVE device considers the MASTER device dead, the SLAVE device flushes the association parameter with the MASTER device and performs a self reboot.

9. The system of claim 1, wherein if the polling request for the data packet is not received by SLAVE device for at least two hours, the SLAVE device considers a MASTER device dead.

10. The system of claim 1, wherein in the MASTER device performs a self reboot to flush off a MASTER node setting in the event the MASTER device loses connection with the server wherein the MASTER node setting comprises a routing table of SLAVE devices, the identifier from the server, the IP address of the server and the association parameters.

11. A method to dynamically detect and form a master slave network, the master slave network comprising:

a server for broadcasting at least one packet in a unified data packet (UDP) format;

a first group of sensor devices, the first group of sensor devices comprising at least one sensor device possessing a booting module, a response module, a wired connectivity and a wireless connectivity;

a second group of sensor devices, the second group of sensor devices comprising at least one sensor device possessing a booting module and a wireless connectivity;

receiving at least one UDP packet broadcast by the server by the first group of sensor devices, and booting up at least one sensor device in the first group of sensor devices as a SLAVE device, wherein a SLAVE device is a sensor device which is controlled by a MASTER sensor device;

sending a response to the server from the first group of sensor devices, wherein the response comprises a MAC address associated with a sensor device in the first group of sensor devices;

responding, by the server, to at least one device in the first group of sensor devices with a server IP address and a first identification code;

receiving, by at least one device in the first group of sensor devices, the server IP address and the first identification code, with said device declaring itself as a MASTER thereupon, wherein a MASTER device is a sensor device which controls at least one SLAVE sensor device;

authenticating, by the at least one MASTER device, at least one device in the second group of sensor devices as a SLAVE device by receiving and decoding a data packet from the at least one SLAVE sensor device; and updating, by the at least one MASTER device, a maintained MASTER routing table with a unique identifier and a MAC address of at least one device in the second group of sensor devices, and establishing a MASTER SLAVE network thereby.

* * * * *